US009246915B2

(12) United States Patent
Springer

(10) Patent No.: US 9,246,915 B2
(45) Date of Patent: Jan. 26, 2016

(54) STREAMING MEDIA FOR PORTABLE DEVICES

(75) Inventor: Gilbert Springer, Fremont, CA (US)

(73) Assignee: AppBANC, LLC, Santa Clara, CA (US)

( * ) Notice: Subject to any disclaimer, the term of this patent is extended or adjusted under 35 U.S.C. 154(b) by 305 days.

(21) Appl. No.: 13/053,077

(22) Filed: Mar. 21, 2011

(65) Prior Publication Data
US 2011/0231903 A1  Sep. 22, 2011

Related U.S. Application Data

(60) Provisional application No. 61/315,848, filed on Mar. 19, 2010.

(51) Int. Cl.
H04L 29/06 (2006.01)
G06F 21/31 (2013.01)
H04L 29/00 (2006.01)
H04N 21/2187 (2011.01)
H04N 21/254 (2011.01)
H04N 21/414 (2011.01)
H04N 21/435 (2011.01)
H04N 21/61 (2011.01)
H04N 21/6547 (2011.01)
H04L 29/08 (2006.01)

(52) U.S. Cl.
CPC ............ H04L 63/0884 (2013.01); G06F 21/31 (2013.01); H04L 29/00 (2013.01); H04L 65/4084 (2013.01); H04L 65/4092 (2013.01); H04L 67/2804 (2013.01); H04N 21/2187 (2013.01); H04N 21/2541 (2013.01); H04N 21/41407 (2013.01); H04N 21/435 (2013.01); H04N 21/6125 (2013.01); H04N 21/6547 (2013.01); G06F 2221/2129 (2013.01); H04L 63/08 (2013.01); H04L 67/02 (2013.01)

(58) Field of Classification Search
CPC combination set(s) only.
See application file for complete search history.

(56) References Cited

U.S. PATENT DOCUMENTS

| | | | |
|---|---|---|---|
| 6,580,950 B1* | 6/2003 | Johnson et al. | 700/17 |
| 6,704,396 B2* | 3/2004 | Parolkar et al. | 379/88.17 |
| 8,250,141 B2* | 8/2012 | Xiao | G06Q 10/10 709/204 |
| 2002/0103850 A1* | 8/2002 | Moyer et al. | 709/202 |
| 2002/0103898 A1* | 8/2002 | Moyer et al. | 709/224 |
| 2003/0043279 A1* | 3/2003 | Alardin | 348/211.3 |
| 2004/0080615 A1* | 4/2004 | Klein et al. | 348/143 |
| 2005/0198063 A1* | 9/2005 | Thomas et al. | 707/102 |
| 2006/0053296 A1* | 3/2006 | Busboom | H04L 63/083 713/182 |

(Continued)

Primary Examiner — Taghi Arani
Assistant Examiner — Phy Anh Vu
(74) Attorney, Agent, or Firm — Sawyer Law Group, P.C.

(57) ABSTRACT

A system and method for allowing hand-held/wireless device devices to (1) provide audio/video conferencing; (2) access AV content through streaming and cloud transfer; and (3) offer hand-held and computer access to cameras and sensors for surveillance using ordinary personal computers as proxy servers is described. In a first aspect, a remote view streaming system which comprises a webcam server which enables streaming video over a network is disclosed. The system includes a portable device. The portable device includes a client application. The portable device is configured to receive the streaming video from the network and display it on a screen. The system includes a proxy server for authenticating a connection between the webcam server and the portable device. In a second aspect, a portable device is disclosed. The portable device comprises a client application; wherein the client application includes authentication information to allow connection to the proxy server and in turn can be connected directly to a webcam server if the webcam server has proper authentication.

9 Claims, 3 Drawing Sheets

(56) References Cited

U.S. PATENT DOCUMENTS

| | | |
|---|---|---|
| 2006/0143692 A1* | 6/2006 | Kodama .............. H04L 12/4604 726/3 |
| 2006/0155851 A1* | 7/2006 | Ma et al. ....................... 709/226 |
| 2007/0104182 A1* | 5/2007 | Gorti ..................... H04L 67/306 370/352 |
| 2007/0121869 A1* | 5/2007 | Gorti ................. H04L 29/06027 379/201.02 |
| 2007/0157301 A1* | 7/2007 | Taglienti ............ H04L 63/0254 726/11 |
| 2007/0198633 A1* | 8/2007 | Thibeault .......... G06F 17/30017 709/203 |
| 2007/0273501 A1* | 11/2007 | Benco et al. ................... 340/531 |
| 2008/0209491 A1 | 8/2008 | Hasek |
| 2008/0282295 A1* | 11/2008 | Gabriel et al. ................... 725/62 |
| 2009/0031381 A1* | 1/2009 | Cohen et al. ................... 725/115 |
| 2009/0234983 A1 | 9/2009 | Golden et al. |
| 2009/0325570 A1 | 12/2009 | Rensin et al. |
| 2009/0327496 A1* | 12/2009 | Klemets et al. ................ 709/227 |
| 2010/0013918 A1* | 1/2010 | Ta'Eed .......................... 348/143 |
| 2010/0235891 A1* | 9/2010 | Oglesbee ............ H04L 67/1095 726/5 |
| 2011/0016319 A1* | 1/2011 | Lundberg et al. ............. 713/170 |
| 2011/0023096 A1* | 1/2011 | Xiao ................... H04L 63/0236 726/5 |

* cited by examiner

STREAMING MEDIA FOR PORTABLE DEVICES

CROSS REFERENCE TO RELATED APPLICATION

Under 35 USC 119(e), this application claims the benefit of U.S. Patent Application No. 61/315,848, entitled "STREAMING MEDIA FOR HAND-HELD/WIRELESS DEVICES," filed on Mar. 19, 2010, which is incorporated herein by reference.

FIELD OF THE INVENTION

The present invention relates generally to portable devices and more particularly to a method and system for streaming media thereto.

BACKGROUND OF THE INVENTION

Substantial interest for extending the usefulness of handheld/wireless device devices for the acquisition of live and stored content through streaming media to hand-held devices is desirable. The present invention addresses such a need.

SUMMARY OF THE INVENTION

A system and method for allowing hand-held/wireless device devices to (1) provide audio/video conferencing; (2) access AV content through streaming and cloud transfer; and (3) offer hand-held and computer access to cameras and sensors for surveillance using ordinary personal computers as proxy servers is described.

In a first aspect, a remote view streaming system which comprises a webcam server which enables streaming video over a network is disclosed. The system includes a portable device. The portable device includes a client application. The portable device is configured to receive the streaming video from the network and display it on a screen. The system includes a proxy server for authenticating a connection between the webcam server and the portable device.

In a second aspect, a portable device is disclosed. The portable device comprises a client application; wherein the client application includes authentication information to allow connection to the proxy server and in turn can be connected directly to a webcam server if the webcam server has proper authentication.

BRIEF DESCRIPTION OF DRAWINGS

The accompanying drawings illustrate an embodiment of the present invention and, together with the description, serve to explain the principle of the invention. One skilled in the art will recognize that the particular embodiments illustrated in the drawings are merely exemplary, and are not intended to limit the scope of the present invention.

FIG. 1 is a diagram of a remote view streaming system in accordance with an embodiment.

DETAILED DESCRIPTION OF PREFERRED EMBODIMENTS

Figure 7:
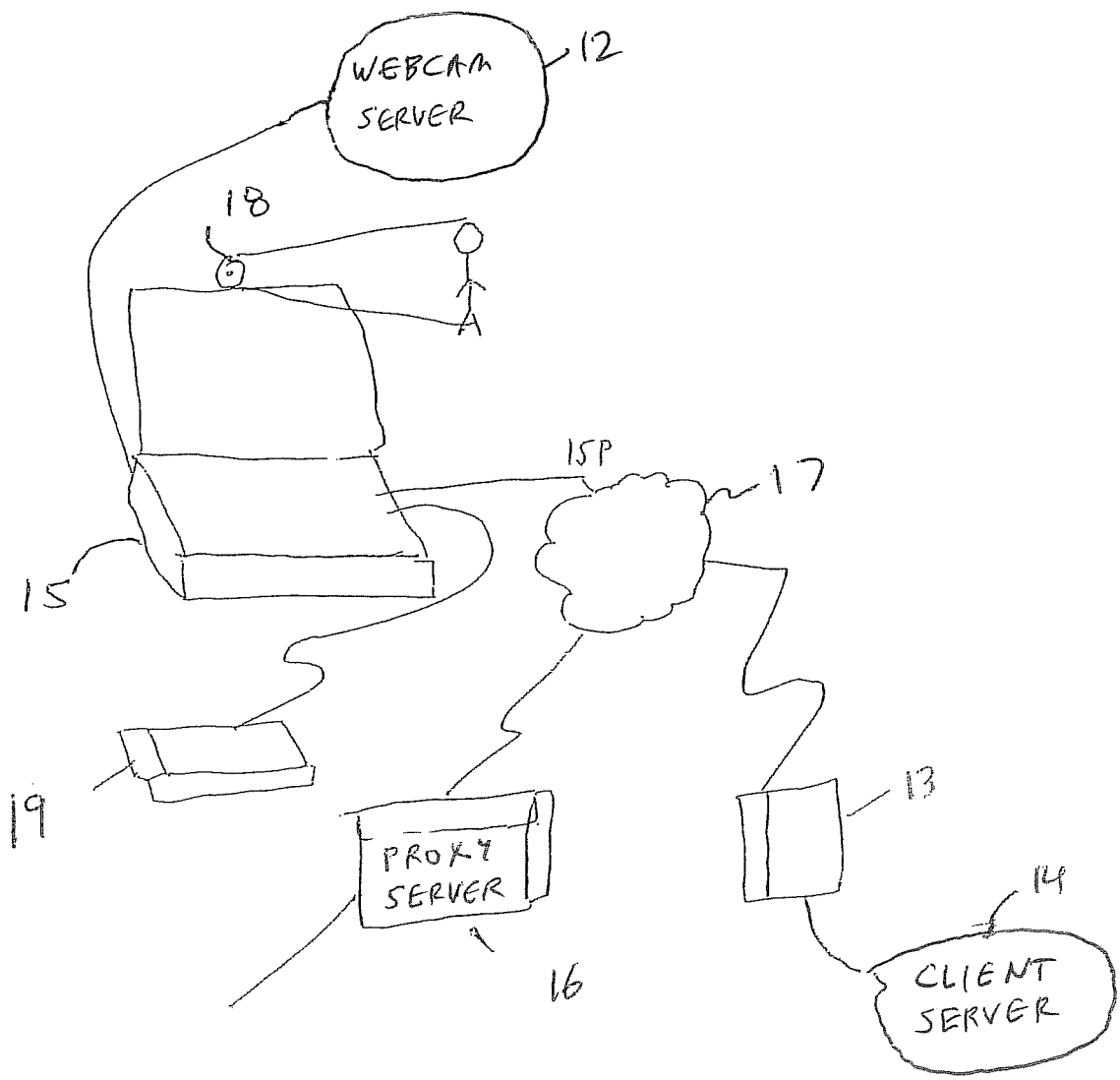

The present invention relates generally to portable devices and more particularly to a method and system for streaming media thereto. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

DEFINITIONS

1. Universal Plug and Play (UPnP).

The UPnP architecture allows device-to-device networking of personal computers, networked home appliances, consumer electronics devices and wireless devices. It is a distributed, open architecture protocol based on established standards such as the Internet Protocol Suite (TCP/IP), HTTP, XML, and SOAP. UPnP control points are devices which use UPnP protocols to control UPnP devices.

The UPnP architecture supports zero configuration networking. A UPnP compatible device from any vendor can dynamically join a network, obtain an IP address, announce its name, convey its capabilities upon request, and learn about the presence and capabilities of other devices. Dynamic Host Configuration Protocol (DHCP) and Domain Name System (DNS) servers are optional and are only used if they are available on the network. Devices can disconnect from the network automatically without leaving state information.

2. NAT Transversal NAT-T (NAT Traversal in the IKE) is a method of enabling IPsec-protected IP datagram's to pass through a network address translator (NAT). It is also a technique for TCP-IP and or VOP connections.

3. Transmission Control Protocol (TCP).

TCP provides a communication service at an intermediate level between an application program and the Internet Protocol (IP). That is, when an application program desires to send a large chunk of data across the Internet using IP, instead of breaking the data into IP-sized pieces and issuing a series of IP requests, the software can issue a single request to TOP and let TOP handle the IP details.

IP works by exchanging pieces of information called packets. A packet is a sequence of octets and consists of a header followed by a body. The header describes the packet's destination and, optionally, the routers to use for forwarding until it arrives at its destination. The body contains the data IP is transmitting.

Due to network congestion, traffic load balancing, or other unpredictable network behavior, IP packets can be lost, duplicated, or delivered out of order. TOP detects these problems, requests retransmission of lost data, rearranges out-of-order data, and even helps minimize network congestion to reduce the occurrence of the other problems. Once the TOP receiver has reassembled the sequence of octets originally transmitted, it passes them to the application program. Thus, TOP abstracts the application's communication from the underlying networking details.

4. NAT Transversal. A Web Exclusive from Windows IT Pro . . . NAT-T uses UDP port 4500 and is quickly being adopted by many organizations.

Features

A streaming media process in accordance with an embodiment provides a means for direct connections with the user's proxy server for remote connectivity, eliminating the streaming load on the host central server. A streaming media process in accordance with an embodiment also provides a means for proxy to hand-held/wireless device client to exchange authentication keys enabling hand-held/wireless device/proxy server connection.

A streaming media process in accordance with an embodiment provides a means for managing media video integrity through frame rate controls. It also provides a streaming media process in accordance with an embodiment which provides a means for recording proxy server source video remotely using a hand-held/wireless device. Moreover, a streaming media process in accordance with an embodiment provides a means for eliminating blocking artifacts on the playback stream from proxy server to hand-held/wireless device.

A streaming media process in accordance with an embodiment provides a means for zooming video images on a hand-held/wireless device. A streaming media process in accordance with an embodiment also provides a means for eliminating media streams to multiple destinations through direct connection between client and server.

A streaming media process in accordance with an embodiment provides a means for improving media stream detection through direct connect simplicity. A streaming media process in accordance with an embodiment also automatically detects a camera (proxy) server using one central (host) proxy server allowing for a direct connection. In addition, a streaming media process in accordance with an embodiment supports Windows 2000/XP/Vista, as well as the Mac OS.

A streaming media process in accordance with an embodiment will send SMS text alerts upon a change in proxy server's video content. Moreover, a streaming media process in accordance with an embodiment will record and time stamp shifts in video content and enable SMS Alert to hand-held/wireless devices.

A streaming media process in accordance with an embodiment supports connectivity with IP Camera with JPEG/MJPEG and H.264 Protocols. A streaming media process in accordance with an embodiment also provides a method for piercing firewall/proxy piercing. In addition, a streaming media process in accordance with an embodiment provides a method for remotely saving/recording screen shots.

A system that utilizes a streaming media process in accordance with the present invention can take the form of an entirely hardware implementation, an entirely software implementation, or an implementation containing both hardware and software elements. In one implementation, this detection procedure is implemented in software, which includes, but is not limited to, application software, firmware, resident software, microcode, etc.

Furthermore, the streaming media process can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present invention in more detail, refer now to the following description in conjunction with the accompanying Figures.

Remote View Application

An implementation of the present invention utilizes a remote view streaming system. FIG. 1 is a diagram of a remote view streaming system in accordance with an embodiment. The remote view streaming system has three modules.

1) A webcam server 12 within a computer 15 which enables streams of live or recorded video over a public network 17 via a video player 19 or a camera 21 coupled to the computer 15.

2) A portable device 13, such as a smartphone, PDA, tablet computer such as the IPAD or other handheld device. The portable device 13 includes a client application 14. The client application 14 receives the live or recorded video from the network 17 and displays the video on a screen of the portable device 13.

3) A proxy server 16 coupled to the network 17, which is the mediator between the webcam server 12 and the client application 14 for establishment of a direct connection therebetween.

Operation

Figure 2:
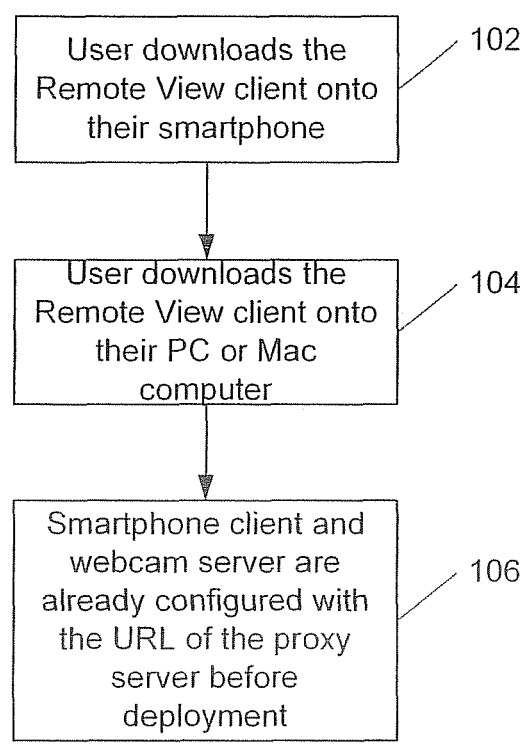
FIG. 2 is a flow chart of a process for setting up the remote view streaming system in accordance with the present invention.

FIG. 2 is a flow chart of a process for setting up the remote view streaming system in accordance with the present invention. First, the user downloads the client application, such as a smartphone client, onto their portable device such as a smartphone, via step 102. Next, the user downloads the webcam server onto their computer system such as a PC or Apple computer, via step 104. Then, a proxy server is deployed on a public network, such as the Internet. Both the client application and the webcam server are configured with the URL of the proxy server before deployment, via step 106.

The user can pair as many webcam servers as desired to their client application by being connected to the same network. The user can manually pair by typing in a key on the webcam server. The user can then go anywhere and login to servers they had previously paired with UPNP without being on the same network (it does not matter whether it is a private or public IP).

Figure 3:
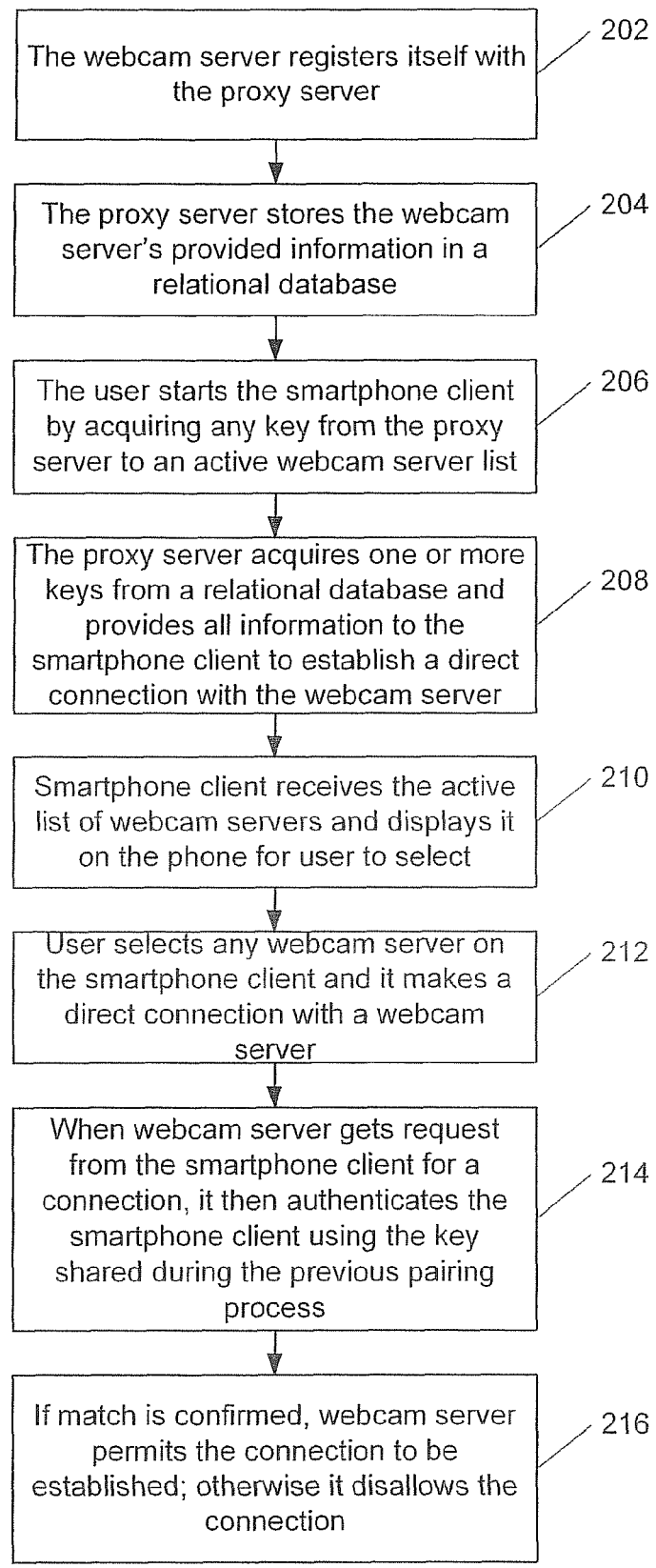
FIG. 3 is a flow chart of a process for utilizing the remote control streaming system in accordance with the present invention.

FIG. 3 is a flow chart of a process for utilizing the remote control streaming system in accordance with the present invention. The user starts the webcam server. First, the webcam server registers itself with the proxy server, via step 202. The proxy server then stores the webcam server's provided information in a relational database, via step 204. The webcam server re-registers itself from time to time to remain active in the relational database.

The user starts the client application by acquiring any key from the proxy server to an active webcam server list, via step 206. The proxy server acquires one or more keys from a relational database and provides all the information to the client application to establish a direct connection with the webcam server, via step 208.

The client application receives the active list of webcam servers and displays it on portable device for the user to select, via step 210. The user selects any webcam server listed on the portable device and the portable device then makes a direct connection with a webcam server, via step 212.

When the webcam server gets a request from the client application for a connection, it then authenticates the client application using the key shared during the previous pairing process, via step 214. If a match is confirmed, the webcam server permits the connection to be established. Otherwise it disallows the connection, via step 216.

Advantages

The user can manually select from the proxy server live (video/images) from the camera. The user can also select and record from the proxy server's camera upon detection of motion (shift in content). Therefore, a push notification can be sent to the smartphone that motion has been detected. Then the user of the smartphone can review the recording and its history.

The user may select frame rates increasing/decreasing live streaming smoothness (correction for bandwidth variances). The user can also choose to receive SMS push notifications when movement is detected and or recorded. The user can remotely load archived videos on their PC and play them on their portable device, such as a smartphone. The user can also apply all previously proven hand-held hand gestures (pinch in/out, double tapping, etc).

The user can refresh the active webcam server list at any time. A universal plug and play (UPnP) is supported for network address translation (NAT) traversal. Motion detection settings can be changed for either the client application or the webcam server.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A remote view streaming system which comprises:
at least one webcam server streaming video from a camera over a network;
a portable device including a client application, the portable device configured to remotely receive the streaming video from the at least one webcam server via the network and display the streaming video on a screen of the portable device, wherein push notifications are received by the portable device when motion is detected on the streaming video; and
a proxy server for authenticating and pairing a connection between the at least one webcam server and the portable device, wherein both the at least one webcam server and the portable device are configured with a URL of the proxy server;
the at least one webcam server registers itself with the proxy server, and is listed on an active list of webcam servers, wherein the proxy server stores the at least one webcam server information in a relational database, wherein the proxy server maintains the active list of webcam servers and shares at least one key to the active list of webcam servers with the portable device, thereby enabling the portable device to view the active list of webcam servers on the screen; and
wherein the at least one key is acquired by the proxy server from the relational database and provides the at least one webcam server's information to the client application to establish the connection between the at least one webcam server and the portable device using the at least one key.

2. The remote view streaming system of claim 1, wherein the at least one webcam server comprises a plurality of webcam servers which are paired to the client application.

3. The remote view streaming system of claim 1, wherein the client application receives the active list of webcam servers after the proxy server authenticates the portable device using the at least one key.

4. The remote view streaming system of claim 1, wherein the portable device comprises a smartphone and the client application comprises a smartphone client.

5. The remote view streaming system of claim 1, wherein the portable device comprises any of a smartphone, PDA, and tablet computer.

6. A portable device comprising:
a processor;
a memory device coupled to the processor; and
a client application coupled to the memory device; wherein the client application, when executed by the processor, remotely receives streaming video from a camera associated with at least one webcam server via a network and receives push notifications when motion is detected on the streaming video, wherein both the at least one webcam server and the portable device are configured with a URL of the proxy server, wherein the client application includes authentication information to allow connection to a proxy server and in turn, connection directly to the at least one webcam server if the at least one webcam server has proper authentication, the at least one webcam server registers itself with the proxy server, and is listed on an active list of webcam servers, wherein the proxy server stores the at least one webcam server information in a relational database, wherein the proxy server maintains an active list of webcam servers and shares at least one key to the active list of webcam servers with the portable device thereby enabling the portable device to view the active list of webcam servers on the screen; and wherein the at least one key is acquired by the proxy server from the relational database and provides the at least one webcam server's information to the client application to establish the connection with the at least one webcam server using the at least one key.

7. The portable device of claim 6, wherein the at least one webcam server comprises a plurality of webcam servers which are paired to the client application.

8. The portable device of claim 6, wherein the client application receives the active list of webcam servers after the proxy server authenticates the portable device using the at least one key.

9. The portable device of claim 6, wherein the portable device is any of a smartphone, PDA, and tablet computer.

* * * * *